April 18, 1967 P. BELUGOU 3,315,231
TWO WIRE CONTROL OF REMOTE UNITS EMPLOYING
TRANSISTOR SWITCH
Filed Dec. 16, 1963 3 Sheets-Sheet 2
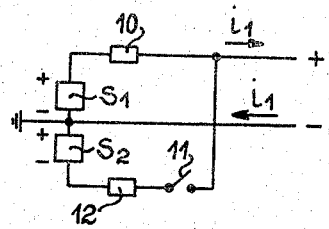
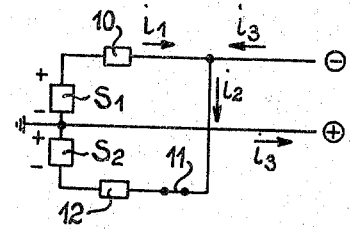
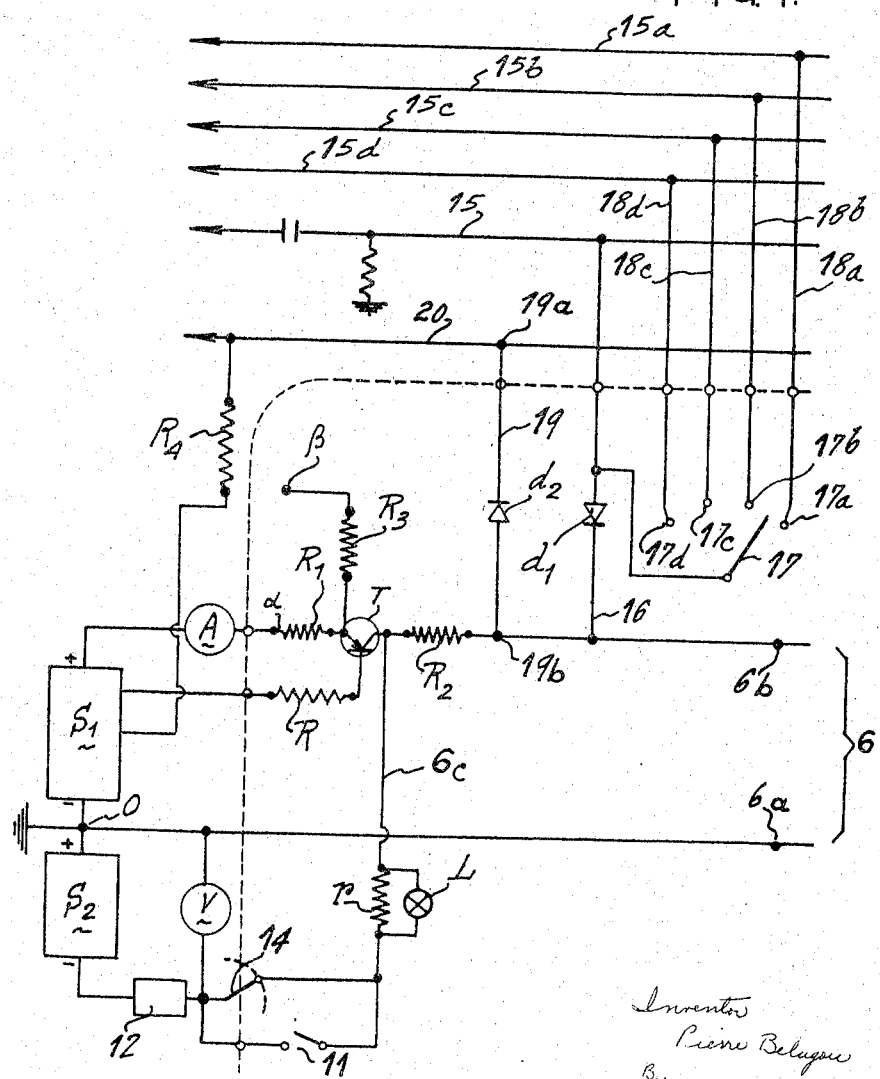
Inventor
Pierre Belugou
By Karl W. Flocks
Attorney

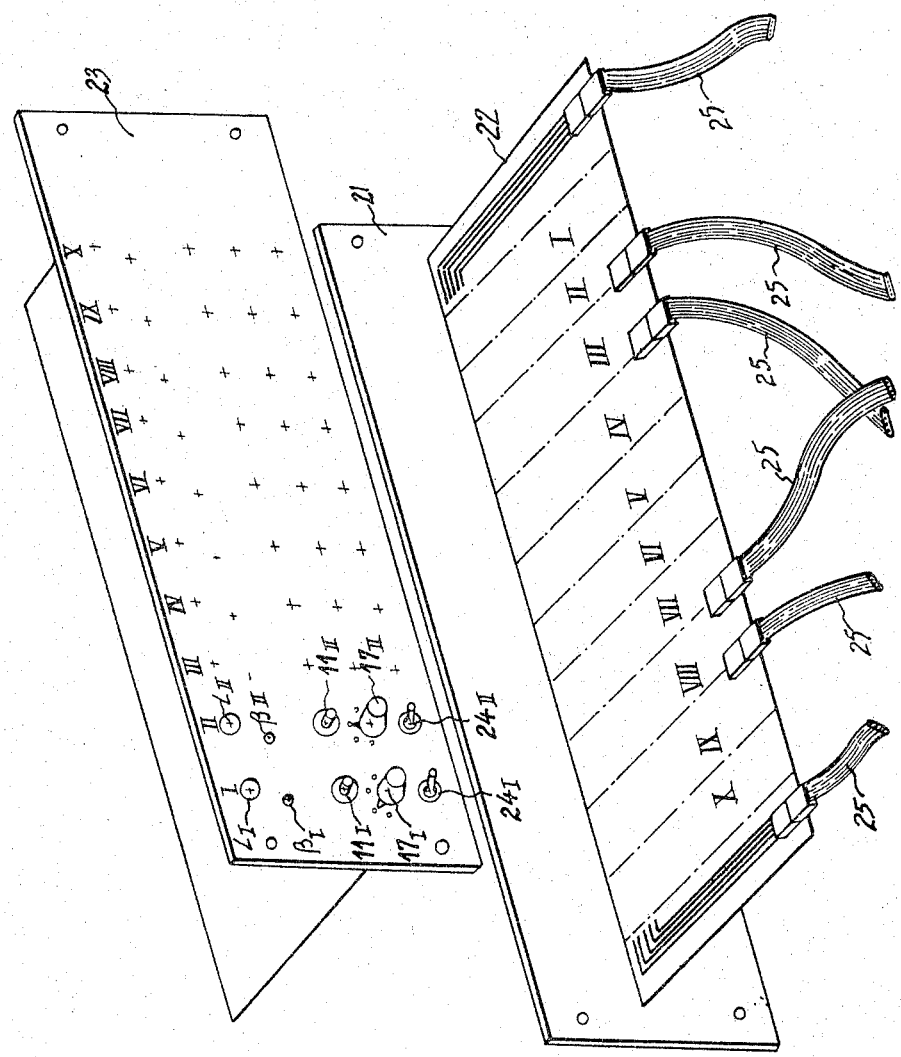

United States Patent Office 3,315,231
Patented Apr. 18, 1967

3,315,231
TWO WIRE CONTROL OF REMOTE UNITS EMPLOYING TRANSISTOR SWITCH
Pierre Belugou, Paris, France, assignor to Charbonnages de France, Paris, France, a public institution of France
Filed Dec. 16, 1963, Ser. No. 330,922
Claims priority, application France, Dec. 18, 1962, 919,055
11 Claims. (Cl. 340—151)

ABSTRACT OF THE DISCLOSURE

The present invention relates to a remote-control device of an apparatus supplied by a re-chargeable accumulator, comprising a general supply source constituted by two sources of direct current connected in series and a two-wire control line, of which one of the two-wires is permanently connected to the common terminal of the two sources while the other wire is connected on the one hand permanently to the end terminal of one of the two sources through a first current-regulating device, whereby the re-charging of the accumulator at a constant current is made, and on the other hand, intermittently to the end terminal of the other source through a second current-regulating device, regulated for a current greater than that of the first current-regulating device, whereby the control of the apparatus is made by releasing a transistor switch coupling the accumulator to the apparatus through a rectifier.

---

Figure 1:
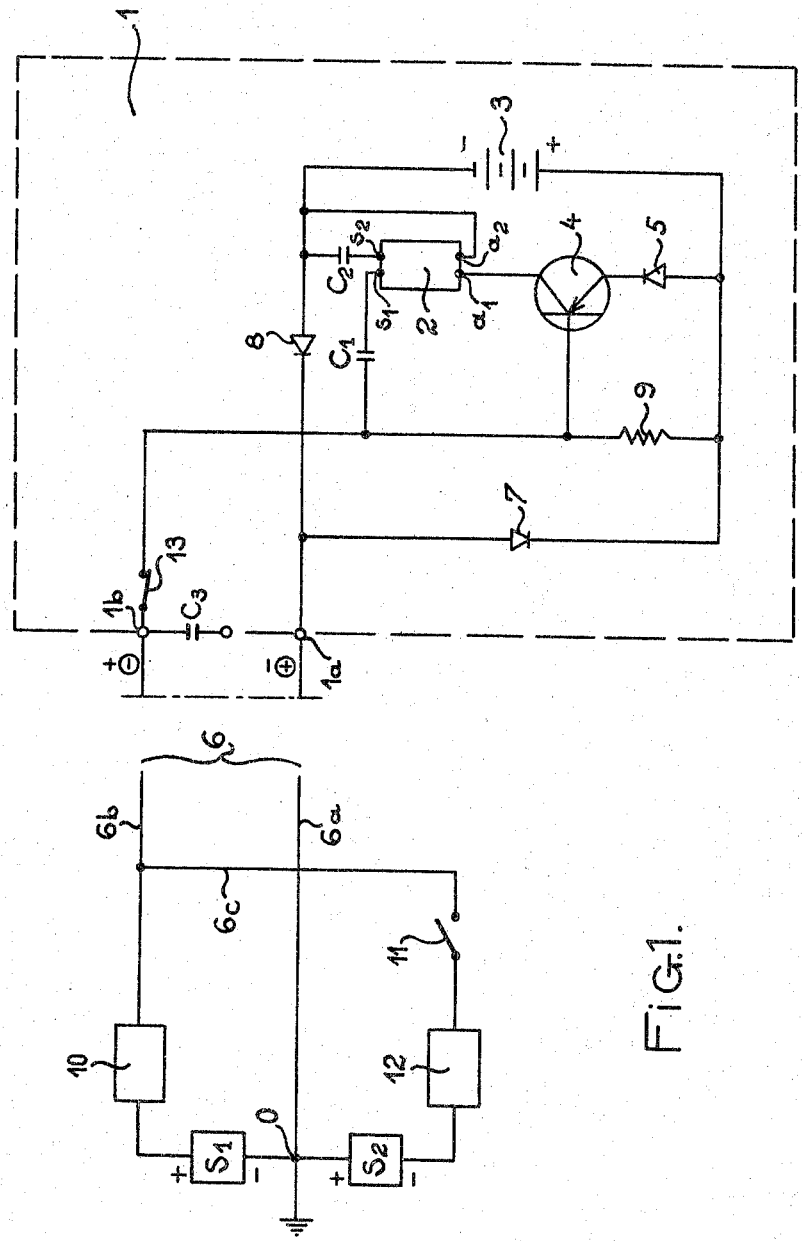

The present invention relates to a control device in which an apparatus to be controlled from a distance is supplied by a re-chargeable accunmulator, and in which it is desired to obtain successively the re-charging of the accumulator at a constant current and the control of the apparatus with a constant current, irrespective of the length of the two-wire control line.

It further enables the intensity of the current circulating in the control line to be limited to a maximum value compatible with certain safety requirements. Finally, it is particularly simple to use in the case where a large number of apparatus are supplied and controlled at a distance from a central station.

In accordance with a further characteristic feature, the non-linear element is a diode connected in the direct sense.

According to another characteristic feature, a number of control lines are connected, as stated above, to a single unit comprising two sources, each line having its own first regulating device, and each line being connected to a second single regulating device through a contactor.

According to a further characteristic feature, the unit comprising contactors of a number of lines is constituted by the contacts of a step-by-step device actuated periodically.

Other characteristic features, advantages and particularities of the present invention will be brought out from the description which follows below with reference to the accompanying drawings which show diagrammatically and simply by way of example without any limitation, one possible form of construction of a circuit control in accordance with the invention.

In the drawings:
FIG. 1 is a diagram of the device according to the invention.
FIGS. 2 and 3 are diagrams of the principle of reversal of polarity in accordance with the invention.
FIG. 4 shows the electrical connection diagram of a remote-control and remote-indication station for an explosion meter device, it being noted that for the sake of clearness of the drawing, only a single transmission line of the control and indication signals of the controlled apparatus has been shown.

FIG. 5 represent a view in isometric perspective of very diagrammatic form of the main constituent elements of a control station with several directions.

The device according to the invention permits an advantageous application of a circuit control device by transistor switch in the case where it is desired to supply and interrogate at a distance a group of several explosion meter devices.

It will in fact be shown in detail later that in accordance with the present invention, it is possible to use the line, not only for the remote control of the supply to an apparatus and to ensure re-charging of the accumulator which supplies it, but also for other functions such as the transmission of a frequency signal, the operation of an alarm and the establishment of telephonic communication.

Before proceeding further with this description, it will briefly be recalled that an explosion meter of the type utilized in the present application posseses the characteristic, when it is put under tension, of emitting a signal having a frequency which is function for example of the content of fire-damp in the atmosphere in which it is placed, it being noted that the frequency signal is transmitted by the same line which ensures the control of the supply of the explosion meter.

It will immediately be seen that instead of employing a single remote-control line, it is possible to employ with advantage a circuit control by transistor switch of the type described below. In this case, in fact, either the explosion meter is interrogated at a distance when the control circuit is closed with a pre-determined polarity, or the built-in accumulator with which it is provided is automatically re-charged when the said control circuit is closed with the opposite polarity.

The reversal of polarity can obviously be carried out by means of a conventional reversing switch, for example with a mechanical relay.

In accordance with a particular feature of the present invention, any reversing device of the type referred to above is eliminated when the method is followed which is shown in FIG. 1.

In this figure, the unit 1 to be controlled comprises:
An explosion meter 2 of the type described above, comprising the input terminals $a_1$ and $a_2$.
A re-chargeable accumulator 3 supplying the explosion meter 2.
A transistor switch 4, in the emitter circuit of which a diode 5 is connected in the direct sense, the explosion meter 2 being itself connected in series in the collector circuit of the said transistor 4, the collector being connected to the input terminal $a_1$.
Two terminals $1a$ and $1b$ to which are respectively connected the wires $6a$ and $6b$ forming the two-wire control line 6. A diode 7 is connected in series in the direct sense between the terminal $1a$ and the diode 5. A diode 8 is connected in series and in the reverse sense between the terminal $1a$ and the input $a_2$ of the explosion meter, which is connected to the negative pole of the accumulator 3.
The terminal $1b$ is connected to the base of the transistor 4, a resistance 9 being connected between the said base and the common point of the diodes 5 and 7, which is connected to the positive pole of the accumulator 3.
The wire $6a$ of the control line is permanently connected to the common terminal O of two sources of direct-current $S_1$ and $S_2$ connected in series, the point O being earthed.
The other wire $6b$ is connected on the one hand permanently to the end terminal of one of the two sources, in the present case the positive terminal of the source $S_1$, through a first current-regulating device of any desired conventional type, shown diagrammatically by the rectangle 10, and on the other hand, intermittently to the end terminal of the other source, in the present case to the negative terminal of the source $S_2$, through the wire 6c, a contactor 11 ensuring the above-mentioned intermittent function, and a second current regulating device shown diagrammatically by the rectangle 12, this regulating device being regulated for a current greater than that of the first regulator device 10.

The reversal of polarity of the current circulating in the line 6 is shown diagrammatically in FIGS. 2 and 3.

If the contactor 11 (FIG. 2) is open, only the source $S_1$ is active and the line 6 has passing through it a current $i_1$. If on the other hand the contactor 11 is closed (FIG. 3), the two sources $S_1$ and $S_2$ in series deliver current, and a current $i_2$ passes through the wire 6c; however, as the regulator device 10 still delivers the current $i_1$, the line 6 has passing through it the current $i_3 = i_1 - i_2$.

It is immediately apparent that if for example the regulating device 10 is set for a current $i_1 = 25$ ma. and the regulator device 12 is set for a current $i_2 = 50$ ma., the line 6 has passing through it a current $i_1$ of $+25$ ma. when the contactor 11 is open and a current $i_3$ of $-25$ ma. when the contactor 11 is closed ($i_3 = -i_1$). It can readily be seen that a change in polarity of the constant current $i_1$ flowing in the line 6 has been effected without the aid of any mechanical reversing device.

When the contactor 11 is open, the polarities of the terminals 1a and 1b are such as indicated in FIG. 1 (signs $+$ and $-$ without circles).

The current $i_1$ follows the path 1b–resistance 9–battery 3–diode 8–1a. In fact, the voltage drop in the resistance 9 brings the emitter of the transistor switch 4 to a potential less than that of its base, and the transistor 4 is blocked. The diode 7 preventing the direct return of the current $i_1$ to the terminal 1a, it can be seen that the accumulator 3 is charged by the current $i_1$.

When the contactor 11 is closed, the polarities of the terminals 1a and 1b are reversed (signs $+$ and $-$ in circles). The current $-i_1$ follows the path 1a–7–5–base of transistor 4–1b. The transistor 4 is released since its emitter is at a potential higher than that of its base.

The transistor 4 being conductive, the accumulator 3 supplies the explosion meter 2, the current $i$ which it delivers following the path 3–5–collector of transistor 4–2–3.

It can thus be seen that by the simple operation of a contactor 11, there is remotely controlled either the recharging of the accumulator 3 during the period of resting time of the explosion meter 2, or the supply of the said explosion meter.

It will be observed that the use of the regulating devices 10 and 12 makes it possible to control and to interrogate the said explosion meter apparatus irrespective of the resistance of the line 6, on the condition that this latter is less than a limiting value chosen so that it is possible to employ an existing telephone line as the supply and interrogation line, when so desired. This may eventually be the case when an explosion meter apparatus has to be provided at a very great distance, for example of the order of several kilometres, from the control station.

The operation of the explosion meter 2 is explained below with more particular reference to FIG. 1.

The explosion meter is supplied by the accumulator 3 when the contactor 11 is closed, the two supply terminals being the terminals $a_1$ and $a_2$. The explosion meter delivers a frequency which is a function of the value of the measurement made. This frequency is injected into the line 6 through the intermediary of the condensers $C_1$ and $C_2$ which block the direct-currents $i_3$ and $i$ respectively, serving to release the transistor switch 4 and to supply the explosion meter 2.

Similarly, it is possible to transmit a telephone communication over the line 6. For that purpose, a self-generating telephone is connected between the terminals 1a and 1b, the connection of the telephone set opening the switch 13 connected in series with one of the two wires 6a and 6b, and normally closed. The remote-control or the interrogation of the unit 1 is momentarily interrupted in order to transmit the telephone communication. A condenser $C_3$ connected between one of the terminals 1a (or 1b) and the wire to which it is connected, blocks the direct-current which could be delivered by the unit comprising the two sources $S_1$–$S_2$ through the telephone set.

When there are a number of control lines 6, these lines can advantageously be connected to a single unit of two sources $S_1$ and $S_2$ in such manner that each line has its own first regulating device 10, and that each line is connected to a second single regulator 12 through the intermediary of a contactor forming part of a step-by-step switch actuated periodically, such as the switch shown diagrammatically at 14 in FIG. 4.

In more detail (see FIG. 4) the regulating device 10 provided on each line is advantageously constituted by a resistance $R_1$ connected in series with a transistor T on the line 6b, the base of the said transistor being connected to the source $S_1$ through the intermediary of a resistance R which gives the reference voltage of the line, which is the normal voltage of the source $S_1$, reduced by 1.5 volts.

By virtue of this arrangement, the safety against inadvertent firing of detonator is ensured in a perfect manner. In order that this safety can be ensured even in the improbable case of a fault in the operation of the regulators, there is mounted in series with the line 6b, for reasons of safety, a resistance $R_2$ having a value determined so as to lose only a small voltage of the order of 5 v.

It is interesting to note that as the supply to the unit 1 during the interrogation is carried out at constant current, the regulating device blocks the alternating signal perfectly, since its apparent impedance $\Delta u/\Delta i$ is infinite, $\Delta i$ being zero.

Furthermore, a resistance $R_3$ is connected upstream of the transistor T, so that by connecting a high resistance voltmeter between the terminals $\alpha$ and $\beta$ (the terminal $\beta$ being common to all the lines in the case of multiple lines), the voltages are measured at the terminals of the resistance $R_1$, which permits the determination of the value of the recharging current of the accumulator incorporated in the explosion meter apparatus.

The correct operation of the whole unit can be checked by reading the total current utilized on an ammeter A connected on the line 6b upstream of the resistance $R_1$.

On the line 6c is mounted an indicator lamp L, shunted if necessary by a resistance $r$.

A voltmeter V enables the satisfactory regulation of the interrogation voltage to be checked for each of the lines interrogated in succession. It should be noted that, as the interrogation current is constant, the interrogation voltage is then proportional to the resistance of the line; the supervision of the condition of the lines is therefore greatly facilitated.

The manual contactor 11 permits the explosion meter apparatus of the corresponding line to be interrogated. However, it is clear that for a large control station there would be an advantage in making the successive interrogation of the different lines automatic, the results of the various interrogations being then automatically registered and the person in charge of the control station being necessarily warned by an appropriate alarm system in the case where the warning level is reached by one of the explosion meter units interrogated, which should then actuate the alarm system at the same time as it transmits the result of its interrogation. It is the function of the step-by-step device 14 to interrogate successively and automatically the different lines connected to the measuring station, the step device 14 being capable of carrying out the same function as the manual contactors 11.

It follows immediately from the foregoing that only the explosion meter apparatus which is put into operation by the selector 14 is interrogated by reason of the reversal of polarity of the supply voltage, the other explosion meter units continuing to be supplied with voltage of reversed polarity which ensures the re-charging of their accumulators.

In FIG. 4, there has been shown below and on the right of the broken line the unit comprising elements associated with a given line, the other elements of the figure being single and serving all the lines.

In accordance with a further characteristic feature of the invention, advantage is taken of the particular features of the system to connect in an especially simple and effective manner, each of the lines 6b to a common frequency-meter line 15 by means of a special line 16 provided with a diode $d_1$ which is normally blocked because of the polarity of the supply voltage. Only the diode $d_1$ which connects the interrogated line 6, the polarity of which is then reversed, to the frequency-meter line 15 becomes conductive.

In this way, the line 15 directs the results of the successive interrogations of the explosion-meter units to a frequency-meter (not shown) the reading of which is either direct or recorded from the said results, for example of the contents of fire-damp in different sites of a mine. It is quite clear that when the amount of fire-damp reaches the alarm value, it is preferable to actuate a light or sound warning system which informs the person in charge of the control station of the existence of danger in a certain particular location.

In order that this alarm may be truly effective, there is a great advantage in being able to personalize the level. It may in fact happen that in the same mine, certain working sites are known as very subject to fire-damp and that attention should only be drawn to it for a content which exceeds the value laid down by rule, whereas for other working sites, a content which is definitely lower would correspond to something abnormal and justifying a warning.

This personalization of the alarm level can be obtained according to the present invention by proceeding as follows:

Downstream of the diode $d_1$ with respect to the interrogated line 6, the line 16 is connected to an alarm level switch 17, the moving element of which can be selectively connected to the terminals 17a, 17b 17c, 17d which are respectively joined by wires 18a, 18b, 18c, 18d to frequency-meter alarm lines 15a, 15b, 15c, 15d having different levels.

According to a further characteristic of the present invention, each of the lines 6 interrogated is connected by a separate wire 19 to a line 20 leading to a telephonic amplifier (not shown) actuating a loud-speaker.

The lines 19 comprise diodes $d_2$ connected in the opposite sense to the diodes $d_1$, and furthermore the telephonic amplifier line 20 is connected to the source $S_1$ through the intermediary of a resistance $R_4$, the value of which is determined in such manner that, when the line 6b is broken, the terminal 19b of the line 19 on the line 6b is at a potential definitely higher than the potential of the terminal 19a of the line 19 on the telephonic amplifier line 20, and in any case at a potential higher than any value measured during the course of operation. By virtue of this arrangement, the diode $d_2$ becomes conductive from the moment when the corresponding line 6b is broken and the resistance $R_4$ has passing through it a certain current $i'$ and in consequence only a broken line can be connected to the input of the loud-speaker amplifier. The other lines are thus not connected and therefore do not introduce any parasitic disturbances.

The telephone communication between a visitor located at a fire damp measuring station and the person in charge of the control station is thus established as follows:

The visitor having for example to supervise an explosion-meter apparatus and its code connected to the end of a line 6, removes the plug protecting a connector; in doing this, he breaks the line 6 and makes the corresponding diode $d_2$ conductive ipso facto. A two-way telephone communication is then possible. It is only necessary for him to connect-up his telephone instrument and speak; the loud-speaker at the control station broadcasts his words and the person in charge of the control station replies. At the moment when the person in charge is about to make an interrogation in order to check the adjustment of the head, the visitor presses a button which restores the continuity of the line; if he did not do this, the person in charge of the control station would be aware of it immediately, since the corresponding indicator lamp L would not light-up.

It is clear that this breaking of the line carried out by the visitor does not differ in any way from an accidental break in this same line.

If the resistance $R_4$ through which passes the current $i'$ in this case, is replaced by a relay of the same resistance responsive to the same current, either a calling device or an alarm system could be operated.

There will now be described with reference to FIG. 5 how the constituent parts of a control station, for example with ten directions, are presented and arranged, it being understood that in order to avoid unnecessary complication of the description, there will only be indicated the location of the various elements the details of which have already been shown in FIG. 4 and precisely described above.

For the sake of clearness of the drawings, only a few series of certain of the standard elements have been shown, the other series being strictly identical.

Referring now to FIG. 5, there can be seen at 21 a frame on which is fixed the printed circuit 22 of the ten lines numbered I, II, . . . X, in front of which is mounted a rack panel 23 bearing the indicator reference of the ten lines I, II, . . . X.

On this panel there can be seen from the top to the bottom: the indicator lamps $L_I$, $L_{II}$ . . .; the sockets $\beta_I$, $\beta_{II}$ . . . enabling the charging current of the accumulators incorporated in the explosion-meter units to be verified; the push-buttons $11_I$, $11_{II}$ . . . permitting the manual interrogations of the various explosion-meter units, the alarm level switches $17_I$, $17_{II}$ . . ., and finally, the start-stop buttons $24_I$, $24_{II}$ . . . when so required.

On the front portion of the plate 22 carrying the printed circuit are provided the sockets permitting the connection of the wires 25 connecting the said printed circuit: to the supply sources, to the frequency meters, to the step-by-step selector and to the lines.

It will of course be understood that the present invention has only been described and illustrated in a purely explanatory manner without any implied limitation, and that modifications of detail could be made thereto without departing from its scope.

I claim:

1. A remote-control device for electrical apparatus units each comprising a re-chargeable accumulator, said device comprising, in combination:
   a transistor switch connected in series in the supply circuit proper of the apparatus to be controlled;
   a releasing circuit for said transistor switch;
   a blocking circuit for said transistor switch;
   a semi-conductor element connected in said releasing circuit in the direct sense;
   a semi-conductor element connected in said blocking circuit in the reverse sense;
   a semi-conductor element connected in the emitter circuit of said transistor switch;
   a general supply source constituted by two direct-current sources connected in series;
   and a two-wire control line between the general supply source and the apparatus to be controlled;
   one of the two wires of said control line being directly connected to the common terminal of the two said sources of direct current;

the other wire of said control line being connected on the one hand permanently to the end terminal of one of the two sources of current through a first current-regulating device and on the other hand, intermittently to the end terminal of the other source of current through a second current-regulating device; whereby the control line is polarized; either in the direction ensuring the charging of the accumulator of the apparatus to be controlled, mounted at the extremity of the line, or in the direction ensuring the supply of said apparatus to be controlled from the general supply source.

2. A device as claimed in claim 1, in which there are provided as many two-wire control lines as there are apparatus units to be controlled, said lines being connected to a single combination of two direct-current sources, each control line having its own first current-regulating device and being connected to a second single current-regulating device through the intermediary of a contactor.

3. A device as claimed in claim 2, in which the whole of the contactors of a plurality of control lines is constituted by the contacts of a step-by-step device actuated periodically.

4. A device as claimed in claim 3, in which the apparatus to be controlled is of the type which transmits, upon reception of an interrogation supply current, a frequency signal which is a function of a particular phenomenon, such as the presence of fire-damp, and in which each of the control lines of a single unit is connected to a common frequency-meter reading line by the intermediary of a diode which is conductive solely when the control line ensures the passage of the interrogation supply current to the apparatus to be controlled.

5. A device as claimed in claim 4, in which there are provided a plurality of common lines of frequency-meter alarms representing different levels of possible alarm, the line corresponding to the desired level being connected through the intermediary of a change-over switch connected to the diode connecting the control line to the frequency-meter line.

6. A device as claimed in claim 5, in which each of the control lines is connected to a telephonic amplifier line through the intermediary of a diode, the circuit being closed by a connection between the telephonic amplifier line and the source of direct-current on which the control line is permanently connected, the circuit parameters of the various units being determined in such manner that the diode only becomes conductive in the sole case of the control line being broken.

7. A device as claimed in claim 6, in which each of the control lines is provided with at least one appropriate switch enabling the line to be broken at will so as thereby to render the diode conductive which connects said line to the telephonic amplifier line.

8. A remote-Control device for apparatus units, each comprising a re-chargeable accumulator, said apparatus units being of the type which transmit, upon reception of an interrogation supply current, a signal having a frequency which is a function of a particular condition such as the presence of fire-damp, said device comprising in combination:

a transistor switch connected in series in the supply circuit proper of the apparatus to be controlled;
a circuit for releasting said transistor switch;
a diode mounted in the direct sense in the emitter circuit of said transistor;
a general supply source constituted by two direct-current sources connected in series;
as many two-wire control lines as there are apparatus units to be controlled, between said units to be controlled and the group of two direct-current sources connected in series, constituting the general supply;
one of the two wires of each control line being directly connected to the common terminal of the two direct-current sources;
the other wire of each control line being connected, on the one hand permanently to the end terminal of one of the two sources of direct-current through a first current-regulating device, on the other hand, intermittently to the end terminal of the other source of current through a step-by-step contactor device actuated periodically and through a second current regulating device common to all the control lines;
at least one common frequency-meter alarm line connected to each of the control lines through the intermediary of diodes made conductive only when said control lines ensure the passage of the interrogation supply current of the apparatus units to be controlled.

9. A device as claimed in claim 8, in which there are provided a plurality of common frequency-meter alarm lines representing different possible levels of alarm, the line corresponding to the desired level being connected through the intermediary of a change-over switch in circuit with the diode connecting the control line to the frequency-meter line.

10. A device as claimed in claim 8, in which the control lines are connected to a common telephonic amplifier line through the intermediary of diodes, the circuit being closed by a connection between the telephonic amplifier line and the source of direct-current to which the control lines are permanently connected, the diodes being made conductive only when the corresponding control line is broken.

11. A device as claimed in claim 10, in which each control line is provided with a switch intended to break the line and to make the diode conductive which connects the corresponding control line to the common telephonic amplifier line.

No references cited.

NEIL C. READ, *Primary Examiner.*

H. PITTS, *Assistant Examiner.*